United States Patent
Hamilton, II et al.

(10) Patent No.: US 7,519,638 B2
(45) Date of Patent: Apr. 14, 2009

(54) METHOD FOR DEVELOPING ENTERPRISE INFORMATION LIFE CYCLE MANAGEMENT POLICIES AND SOLUTIONS

(75) Inventors: Rick A. Hamilton, II, Charlottesville, VA (US); Gino A. Palozzi, Westerville, OH (US); Evan Salop, Riverside, CT (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 11/382,144

(22) Filed: May 8, 2006

(65) Prior Publication Data
US 2007/0260640 A1  Nov. 8, 2007

(51) Int. Cl.
*G06F 17/30* (2006.01)
(52) U.S. Cl. ............... 707/205; 707/101; 707/102; 707/103 R; 707/104.1
(58) Field of Classification Search ............... 707/1–10, 707/100–14.1, 200–206
See application file for complete search history.

(56) References Cited

U.S. PATENT DOCUMENTS

| | | | |
|---|---|---|---|
| 6,397,221 B1 | 5/2002 | Greef et al. | |
| 6,442,549 B1 | 8/2002 | Schneider | |
| 6,662,183 B2 | 12/2003 | Beyer | |
| 7,092,975 B2 * | 8/2006 | Bradley et al. | 707/204 |
| 2002/0147715 A1 | 10/2002 | Beyer | |
| 2004/0044757 A1 | 3/2004 | Baker | |
| 2005/0108474 A1 | 5/2005 | Zhang et al. | |

* cited by examiner

*Primary Examiner*—Isaac M Woo
(74) *Attorney, Agent, or Firm*—Cardinal Law Group; David A. Mims; Robert C. Rolnik

(57) ABSTRACT

A method for determining storage requirements includes receiving a plurality of files to be stored, classifying the plurality of files based on business value, classifying the plurality of files based on contractual obligations, classifying the plurality of files based on empirical characteristics, and determining a storage medium based on the classified business value, classified contractual obligation, and classified empirical characteristics. The method further includes determining storage requirements based on the determined storage mediums.

5 Claims, 6 Drawing Sheets

METHOD FOR DEVELOPING ENTERPRISE INFORMATION LIFE CYCLE MANAGEMENT POLICIES AND SOLUTIONS

FIELD OF INVENTION

The present invention generally relates to information life cycle management. More specifically, the invention relates to methods for developing information life cycle management policies and solutions on an enterprise level.

BACKGROUND OF THE INVENTION

The ability to store increasing amounts of data leads to spiraling information life cycle management problems. Even as storage media are able to store an increasing amount of data at decreasing cost on a per unit basis, the growth in data collection results in undesirable data storage costs.

As information technology management objectives shift to include cost control efforts, an increased emphasis on IT environment optimization has been felt in many IT departments. Controlling information becomes a higher priority as the strategic alignment of business with IT becomes increasingly defined and mature. Indeed, many IT budgets have storage as the largest line item, resulting in increased pressure to contain storage costs. In response to increasing cost pressures, IT management is driven to review the information itself.

It is therefore a challenge to develop a method to develop information life cycle strategies to overcome these, and other, disadvantages.

SUMMARY OF THE INVENTION

A first embodiment of the present invention is a method for determining storage requirements. The method includes receiving a plurality of files to be stored, classifying the plurality of files based on business value, classifying the plurality of files based on contractual obligations, classifying the plurality of files based on empirical characteristics, and determining a storage medium based on the classified business value, classified contractual obligation, and classified empirical characteristics. The method further includes determining storage requirements based on the determined storage mediums.

A second embodiment of the present invention is a computer usable medium including computer readable code for determining storage requirements including computer readable code for receiving a plurality of files to be stored, computer readable code for classifying the plurality of files based on business value, computer readable code for classifying the plurality of files based on contractual obligations, computer readable code for classifying the plurality of files based on empirical characteristics, and computer readable code for determining a storage medium based on the classified business value, classified contractual obligation, and classified empirical characteristics. The medium further includes computer readable code for determining storage requirements based on the determined storage mediums.

A third embodiment of the present invention is a system for determining storage requirements including means for receiving a plurality of files to be stored, means for classifying the plurality of files based on business value, means for classifying the plurality of files based on contractual obligations, means for classifying the plurality of files based on empirical characteristics, and means for determining a storage medium based on the classified business value, classified contractual obligation, and classified empirical characteristics. The system further includes means for determining storage requirements based on the determined storage mediums.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
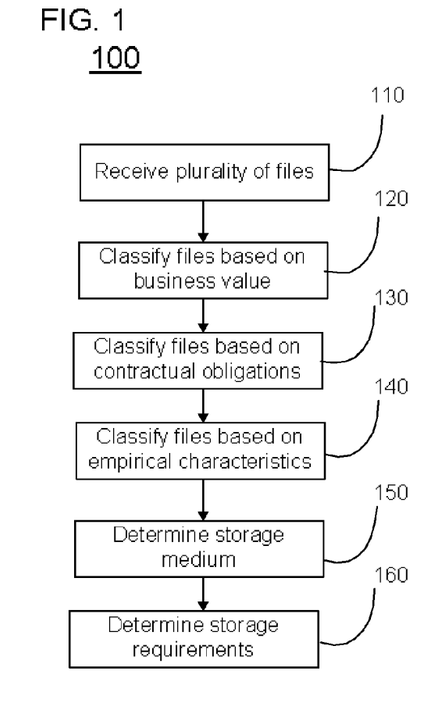
FIG. 1 illustrates one embodiment of a method for determining storage requirements in accordance with one aspect of the invention.

FIG. 1 illustrates one embodiment of a method 100 for determining storage requirements in accordance with one aspect of the invention. Any of the inventive methods disclosed herein may be performed in any order, and the order in which the method steps are described does not limit the order in which the steps can be performed.

Figure 5:
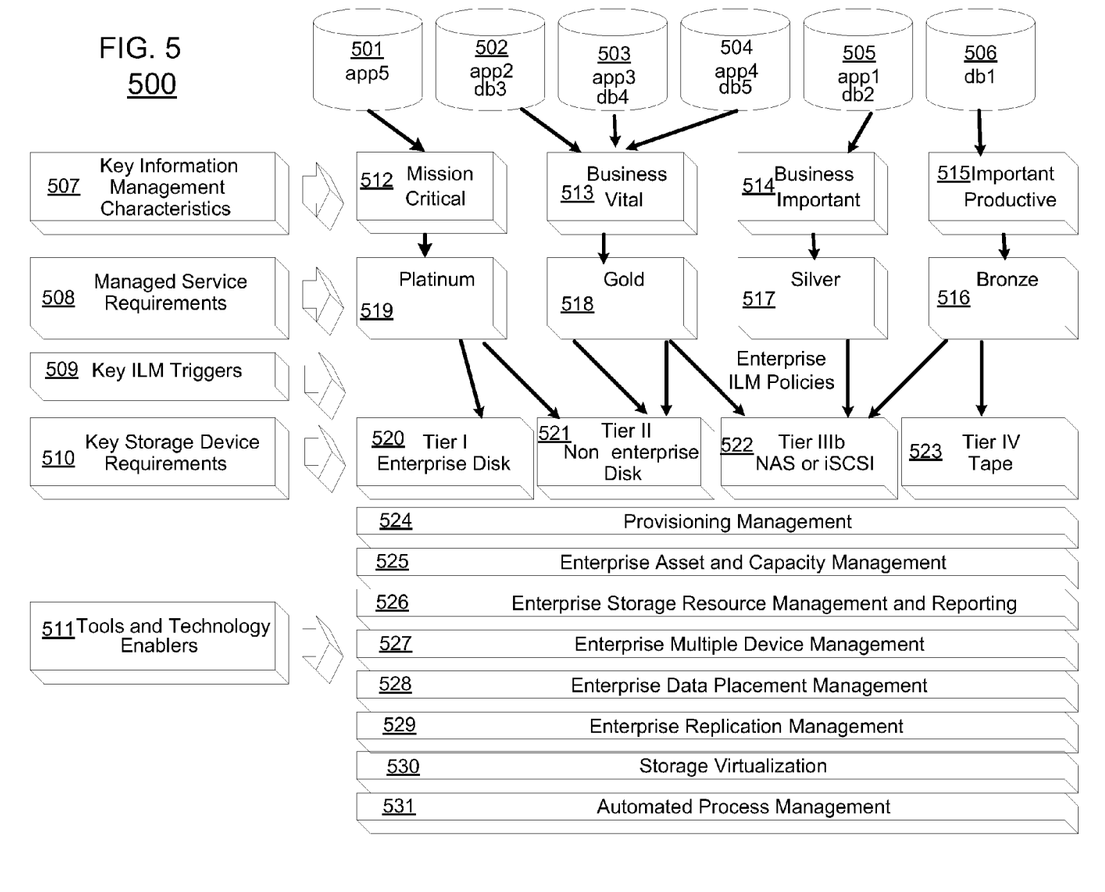
FIG. 5 schematically illustrates another embodiment of a method for determining storage requirements in accordance with one aspect of the invention.

Method 100 begins at step 110 by receiving a plurality of files to be stored. A file can be any arrangement of data, such as data, application, or executable. The files can be received on storage media, or via a network connection. Exemplary files 501-506 are shown in FIG. 5.

After receiving the files, the files are classified based on business value at step 120. Classifying the files based on business value includes mapping each file to one key information management characteristic ("KIMC"), such that each file is mapped to one and only one KIMC. Exemplary KIMC 507 are shown at 512-515 in FIG. 5, and include "mission critical", "business vital", "business important", and "important productive". Other potential KIMC include "not important", "move", and "discard". It should be clear that multiple files may be mapped to each KIMC.

After receiving the files, the files are classified based on contractual obligations at step 130. Data storage is often covered by commercial contractual obligations, such as for data storage services. Storage service providers often feature a plurality of levels of service covering different backup strategies, access times, access techniques and other characteristics of storage services. Contractual obligations relate to service quality determined by contracts. Exemplary contractual obligations, such as managed service requirements are shown in FIG. 5 at 516-519, include "platinum", "gold", "silver", and "bronze". Under some storage service contracts each managed service requirement is directly mapped to one and only one KIMC. For example, as illustrated in FIG. 5, mission critical KIMC 507 data is mapped to platinum 519 managed service requirements.

The received files are classified based on empirical characteristics at step 140. Empirical characteristics are factors observed from system performance. One exemplary empirical characteristic is file access time. Other empirical characteristics include modification time, back up policies, archive policies, and vault policies.

Based on the classified business value, contractual obligations, and empirical characteristics, method 100 determines at least one storage medium for each of the plurality of files at step 150. Storage media can be selected from any appropriate storage medium, such as enterprise disks, non-enterprise disks, RAID systems, Network Attached Storage systems, SCSI systems, and tape drives.

Based on the determined storage medium, method 100 determines storage requirements at step 160. Determining storage requirements includes determining the nature and extent of current storage solutions, as well as the nature and extent of any needed storage solutions to satisfy the classified files. For example, at step 160, method 100 can determine that additional storage media are required in order to store important productive classified data subject to a bronze managed service requirements such that access within 100 milliseconds will be available, and that the additional storage media can be tape drives. Alternatively, if additional files with business critical KIMC under a platinum managed service requirement are to be stored, method 100 can determine that additional RAID drives, or enterprise drives are required. In yet another example, method 100 determines that an additional amount, but a negligible amount of storage is required, and an additional SCSI drive will provide sufficient storage to store business important KIMC under a silver managed service requirement.

Each classification step (i.e. steps 120, 130, 140) can be performed in any appropriate order, including substantially simultaneously. In one embodiment, classifying the plurality of files based on contractual obligations is responsive to classifying the plurality of files based on business value, while in other embodiments, classifying the plurality of files based on business value is responsive to classifying the plurality of files based on contractual obligations. Executing the steps of method 100 in alternate sequences is anticipated.

Figure 2:
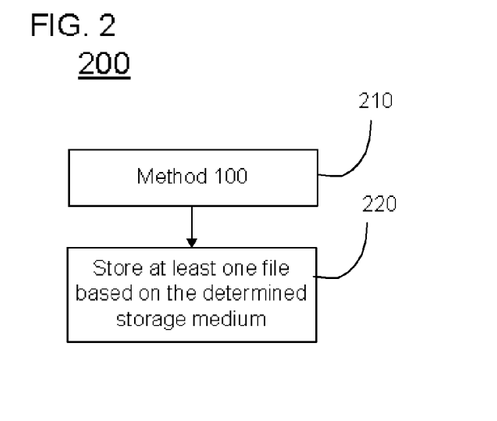
FIG. 2 illustrates another embodiment of a method for determining storage requirements in accordance with one aspect of the invention.

FIG. 2 illustrates another embodiment of a method 200 for determining storage requirements in accordance with an aspect of the invention. Method 200 begins at step 210 by implementing method 100 described above. After determining the storage medium (such as at step 150), method 200 stores at least one of the received files on the determined storage medium at step 220. In one embodiment, step 220 includes determining a file size for each file to be stored, determining whether an appropriate storage medium is available, and determining whether the available storage medium has available space. In the event that space is available, the file is stored to the determined storage medium. In the event that space is not available, method 200 determines whether additional space is available or can be made available, and executes error policies as known.

Figure 3:
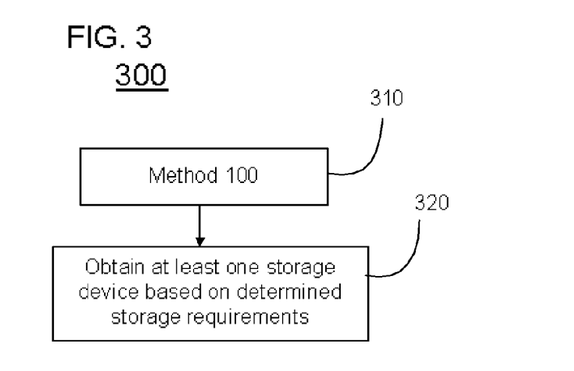
FIG. 3 illustrates another embodiment of a method for determining storage requirements in accordance with one aspect of the invention.

FIG. 3 illustrates another embodiment of a method 300 for determining storage requirements in accordance with an aspect of the invention. Method 300 begins at step 310 by implementing method 100 described above. At step 320, at least one storage device is obtained based on the determined storage requirements. Obtaining the storage device can include issuing a request for the device, purchasing an appropriate storage device, and/or connecting a storage device to a network.

Figure 4:
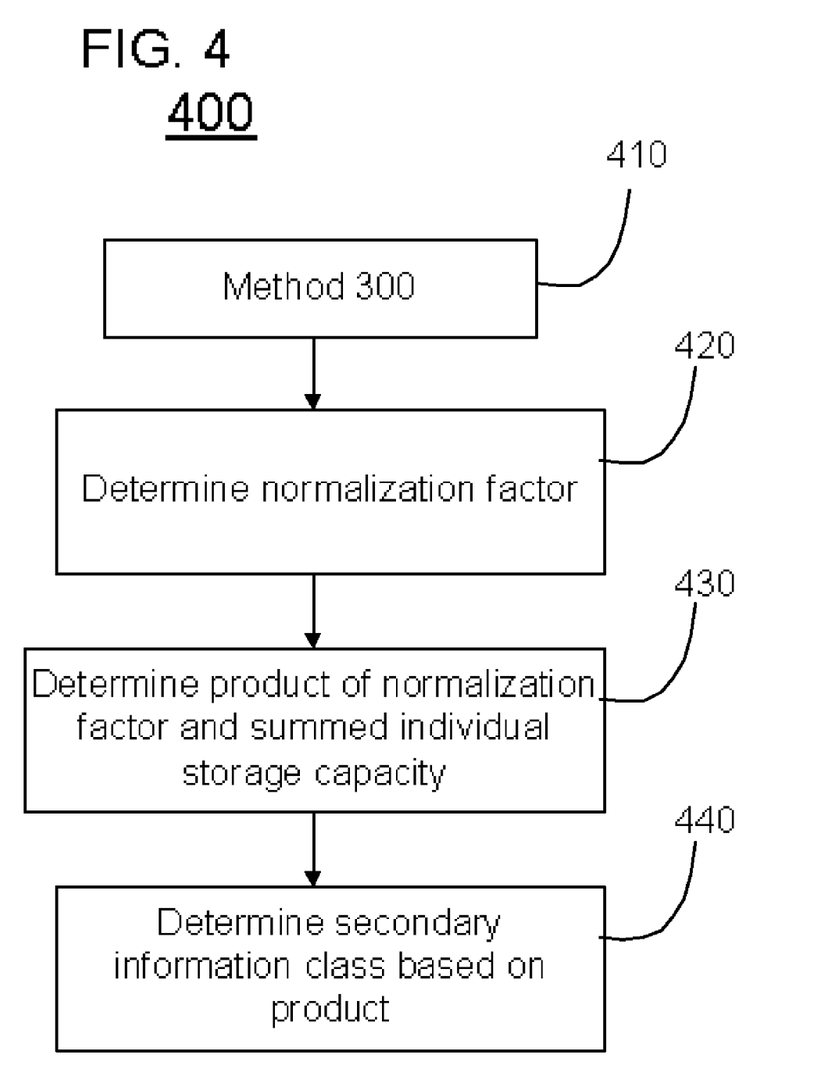
FIG. 4 illustrates another embodiment of a method for determining storage requirements in accordance with one aspect of the invention.

FIG. 4 illustrates one embodiment of a method 400 for determining storage requirements in accordance with an aspect of the invention. Method 400 begins at 410 by executing method 300, and continues at step 420 by determining a normalization factor. The normalization factor is a number to reduce the impact of statistical improbabilities on the calculation and utilization of storage devices.

Method 400 then determines a product of the normalization factor and a sum of the individual used storage capacity of each storage medium, at step 430, and based on the product, determines at least one secondary information class at step 440. The secondary information class classifies each file based on weighting factors.

FIG. 5 graphically illustrates method 100 at 500. As shown at 500, a plurality of files 501-506, apps 1-5 and db 1-5 are mapped to one KIMC 507 (such as mission critical 512, business vital 513, business important 514 or important productive 515), and each KIMC 507 is mapped to one managed service requirement 508. In response to key information life cycle management triggers 509 in the form of enterprise ILM policies, each file is mapped to a key storage device requirement 510 such that the file will receive appropriate storage based on its KIMC, managed service requirement and the enterprise ILM policies. Key storage devices include Tier 1 Enterprise disks 520, Tier II non-enterprise disks 521, Tier IIIb NAS or iSCSI drives 522, and Tier IV tape drives 523.

Tools and technology enablers 511 contribute to effect each of these processes. Tools and technology enablers include provisioning managers 524, enterprise asset and capacity managers 525, enterprise storage resource management and reporting 526, enterprise multiple device managers 527, enterprise data placement managers 528, enterprise replication managers 529, storage virtualization 530, and automated process management 531.

Figure 6:
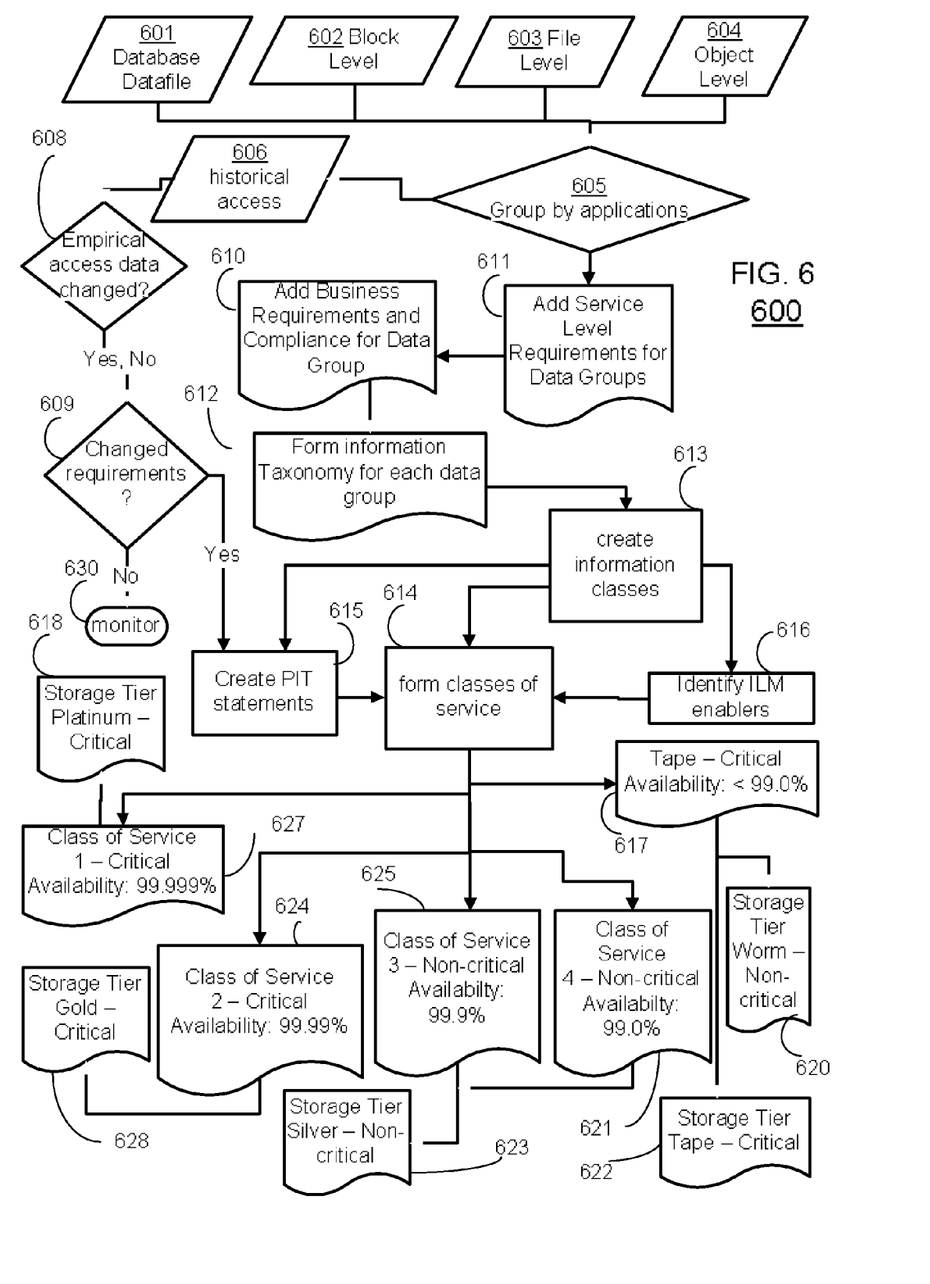
FIG. 6 schematically illustrates another embodiment of a method for determining storage requirements in accordance with one aspect of the invention.

FIG. 6 illustrates a flowchart showing further details 600 of the methods disclosed herein. As shown, characteristics of each file, including the database datafile characteristics 601, block level characteristics 602, object level characteristics 603 and file level characteristics 604 combine to group applications 605 at a filesystem level. Each of the characteristics include access times, size, modification times, archive and/or vaulting times. These database datafile characteristics, block level characteristics, object level characteristics and file level characteristics are each exemplary KIMCs that are derived from empirical and assessed data 606.

After grouping 605 the applications based on the KIMCs, method 600 engages in information taxonomy management 612. First, the method determines whether historical access characteristics 606 are being maintained, and whether the service business, or ILM policies have changed 608. If not, method 600 continues to monitor 630 the service business and ILM policies and access characteristics 630 to ensure continual satisfaction of demand. Additionally, method 600 classifies the grouped applications into data groups 605, and adds service level requirements 611 for each data group. Service level requirements include availability, recoverability and security. Method 600 further adds business requirements and compliance to each data group 610, and forms an information taxonomy 612 for each group based on the grouped applications, service level requirements, and business requirements and compliance.

After forming the information taxonomies and after determining a change in empirical access patterns, service business, or ILM policies, the method monitors for observable patterns and trends that the applications/files form to create information classes 613. Additionally, PIT statements 615 are created about information classes, such as data placement and/or retention policies. Exemplary PIT statements include events, triggers, and actions. Furthermore, ILM enablers are identified 616 for each information class. Exemplary ILM enablers include hierarchy management, duplication management, compliance management, vaulting and media management, access management, data destruction policies and management. Collectively, creation of PIT statements, identification of ILM enablers and creation of information classes can be referred to as data placement management.

In response to the data placement management, the files are classified into classes (617, 621, 624, 625, 627) of service 614, and stored on the appropriate storage tier 618, 628, 623, 622, 620. As shown in FIG. 6, five service classes are shown (617, 621, 624, 625, 627) (1, 2, 3, 4, and 5, each with decreasing availability) mapped into five storage tiers.

Figure 7:
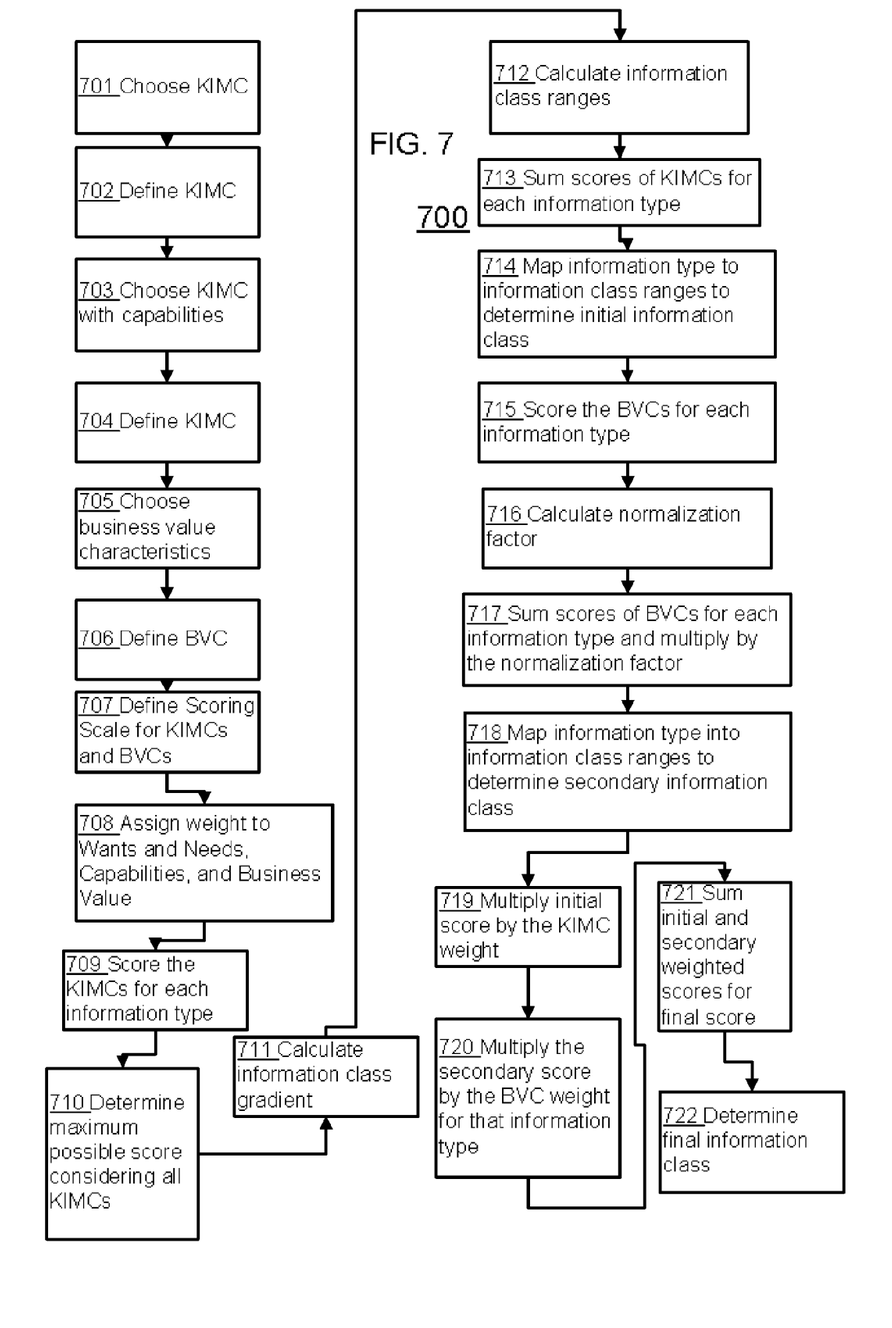
FIG. 7 illustrates an embodiment of a method for determining information class ranges in accordance with one aspect of the invention.

FIG. 7 illustrates an exemplary embodiment of a method 700 for information classification in accordance with one aspect of the invention. Method 700 begins at 701 by choosing KIMCs, based on recoverability, availability, performance, scalability, manageability and/or security. The KIMCs are chosen based on business wants and/or needs.

After choosing the KIMCs, the KIMCs are defined at step 702. Defining the KIMC are similarly based on the wants and needs. For example, the business may require that the data be available 99.999% of the time, with little scalability. Other definitions are anticipated.

Having defined the KIMCs, the KIMC as chosen based on IT capabilities considered, at step 703. IT capabilities to be considered include recoverability, Recovery Time Objectives ("RTO"), Recovery Point Objectives ("RPO"), Backup/Recovery Cycles, Archive/Recovery Cycles, and the like. Based on the chosen KIMC, the KIMC are defined in light of the IT capabilities at step 704.

Business value characteristics ("BVC") are chosen at step 705 and defined at step 706. The characteristics include, inter alia, business value, business criticality, outage costs, costs to rebuild, and total cost of operations ("TCO"). A scoring scale is assigned for the KIMCs and BVCs at step 707, such as a scale from one to five. The scoring scale allows for weighting the effects of various KIMCs and/or BVCs. After choosing and defining the BVCs and assigning the scoring scale, each information type is weighted according the scoring scale at step 708. Each KIMC for each information type is then scored based on the scoring scale at step 709, and the maximum possible score considering all KIMCs is determined at step 710. An information class gradient is then calculated at step 711. A range of information class ranges is calculated based on a maximum number of information classes at step 712. For example, the maximum number of classes can be six, although both lesser and greater numbers can be utilized within the scope of the invention.

The KIMC scores are summed at step 713, and the information types are mapped to information class ranges to determine an initial information class at step 714. Based on the initial information class, the BVCs are scored according to the scoring scale at step 715, and a normalization factor is calculated at step 716. In one example, the normalization factor is based on 500. At step 717, a sum of the scores for the BVCs for each information type are multiplied by the normalization factor. Based on the normalized results, each information type is mapped to an information class range to determine a secondary information class at step 718.

At step 719, the initial scores are multiplied by the KIMC weight, and, at step 720, the secondary scores are multiplied by the BVC weight for that information type. At step 721, the sum of the results (the initial weighted score the and secondary weighted score) of steps 719 and 720 are determined as the final score. Based on the final score, each information type is mapped into information class ranges to determine the final information class.

Figure 8:
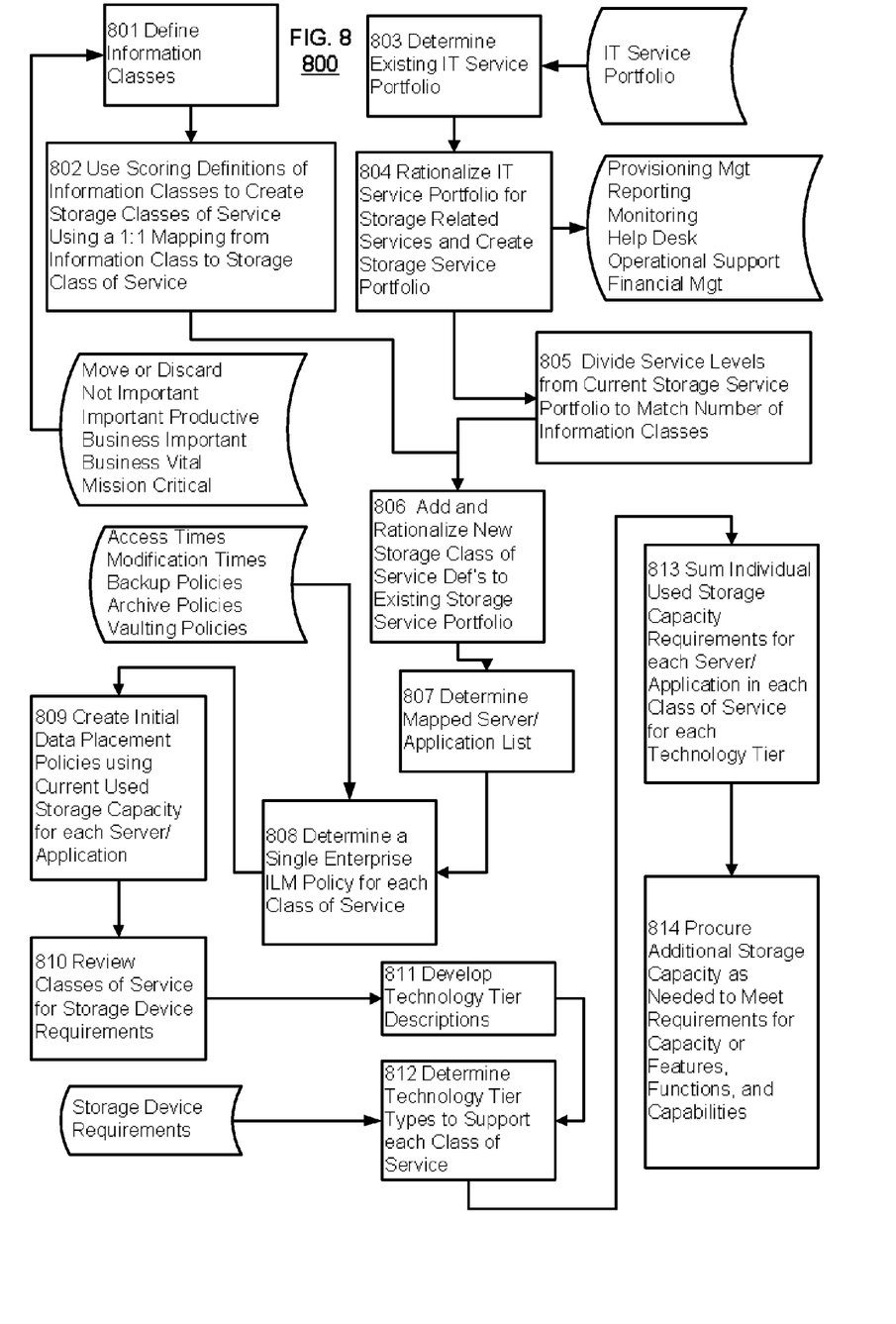
FIG. 8 illustrates an embodiment of a method for procuring additional storage, in accordance with another aspect of the invention.

FIG. 8 illustrates an exemplary method 800 for determining a class of service in accordance with one aspect of the invention. Method 800 begins at 801 by defining information classes, such as move or discard, not important, important productive, business important, business vital, and mission critical. Method 800 then uses scoring definitions of information classes to create storage classes of service with a one to one (1:1) mapping from information class to storage class of service.

Additionally, the existing IT service portfolio is determined at step 803, and the existing IT service portfolio is rationalized for storage related services and a storage service portfolio is created at step 804. The storage service portfolio can include provisioning management and reporting, help desk and operational support, and financial management. The service levels from the current storage service portfolio are divided to match the number of information classes (step 801) at step 805.

Based on the divided storage service portfolio from step 805 and the 1:1 mapping of information classes to storage classes from step 802, a new storage class is added and rationalized to the existing storage service portfolio at step 806. The new storage class includes service definitions for the existing storage service portfolio for each storage level. For each of storage class of service, a mapped server/application list is determined at step 807.

Based on access times, modification times, backup policies, archive policies, and vaulting policies, as well as the mapped server/application list, method 800 then uses these empirical characteristics for each server/application to determine a single enterprise ILM policy for each class of service at step 808. Based on the determined enterprise ILM policy, initial data placement policies are created using the current or legacy used storage capacity for each server/application at step 809.

The classes of service are reviewed for storage device requirements, such as continuous replication, at step 810, and technology tier descriptions are developed at step 811. In response to the technology tier descriptions, technology tier types support each class of service are determined from storage device requirements at step 812. The individual used storage capacities for each server/application in each class of service for each technology tier are summed at step 813, and based on that sum, additional storage capacity is procured as needed to meet requirements for capacity, features, functions, and/or capabilities at step 814.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method of determining storage requirements comprising:
- receiving a plurality of files to be stored;
- classifying the plurality of files based on business value;
- classifying the plurality of files based on contractual obligations;
- classifying the plurality of files based on empirical characteristics;
- determining a storage medium based on the classified business value, classified contractual obligation, and classified empirical characteristics;
- determining storage requirements based on the determined storage mediums wherein determining storage requirements based on the determined storage mediums comprises summing individual used storage capacity requirements for each of the plurality of files;
- determining a normalization factor;
- determining a product of the determined normalization factor and summed individual used storage capacity;
- determining at least one secondary information class based on the product; and
- storing at least one of the received plurality of files based on the determined storage medium.

2. The method of claim 1 wherein classifying the plurality of files based on contractual obligations is responsive to classifying the plurality of files based on business value.

3. The method of claim 1 wherein classifying the plurality of files based on business value is responsive to classifying the plurality of files based on contractual obligations.

4. The method of claim 1 wherein the empirical characteristics include at least one characteristic selected from the group consisting of access time, modification time, backup policies, archive policies, and vaulting policies.

5. The method of claim 1 further comprising obtaining at least one storage device based on the determined storage requirements.

* * * * *